United States Patent
Holmer

(10) Patent No.: US 7,328,358 B1
(45) Date of Patent: *Feb. 5, 2008

(54) HIGH QUALITY AND HIGH PERFORMANCE THREE-DIMENSIONAL GRAPHICS ARCHITECTURE FOR PORTABLE HANDHELD DEVICES

(75) Inventor: Bruce Holmer, Belmont, CA (US)

(73) Assignee: Nvidia Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/601,413

(22) Filed: Nov. 17, 2006

Related U.S. Application Data

(62) Division of application No. 10/667,098, filed on Sep. 18, 2003.

(51) Int. Cl.
*G09G 5/00* (2006.01)

(52) U.S. Cl. ............ 713/323; 713/300; 713/310; 713/320; 713/321; 713/324; 345/546; 345/606

(58) Field of Classification Search ........ 713/300, 713/310, 320–324; 345/546, 606
See application file for complete search history.

(56) References Cited

U.S. PATENT DOCUMENTS

| | | | |
|---|---|---|---|
| 6,222,550 B1 * | 4/2001 | Rosman et al. ........ 345/419 |
| 6,275,234 B1 * | 8/2001 | Iwaki ................ 345/428 |
| 6,384,833 B1 * | 5/2002 | Denneau et al. ........ 345/522 |
| 6,473,089 B1 * | 10/2002 | Wei et al. ............. 345/581 |
| 6,678,834 B1 * | 1/2004 | Aihara et al. .......... 713/501 |
| 6,720,969 B2 * | 4/2004 | Lavelle et al. ......... 345/557 |
| 6,778,179 B2 * | 8/2004 | Lavelle et al. ......... 345/557 |
| 6,831,617 B1 * | 12/2004 | Miyauchi et al. ........ 345/33 |
| 6,848,011 B2 * | 1/2005 | Park et al. ............ 710/14 |
| 2004/0073591 A1 * | 4/2004 | Giacalone ............ 708/650 |

OTHER PUBLICATIONS

Kurt Fleischer, "Polugon Scan Conversion Derivations," Caltech-CS-TR-91-12, 1995 (University Technical Report).
Kurt Fleischer & David Salesin, "Accurate Polygon Scan Conversion Using Half-Open Intervals," Graphics Gem III, Academic Press 1992.
Olin Lathrop, David Kirk, and Doug Voorhies, "Accurate Rendering by Subpixel Addressing," IEEE Computer Graphics & Application, pp. 45-53, 10(5), 1990.

* cited by examiner

*Primary Examiner*—A. Elamin

(57) ABSTRACT

A high quality and performance 3D graphics architecture suitable for portable handheld devices is provided. The 3D graphics architecture incorporates a module to classify polygons by size and other characteristics. In general, small and well-behaved triangles can be processed using "lower-precision" units with power efficient circuitry without any quality and performance sacrifice (e.g., realism, resolution, etc.). By classifying the primitives and selecting the more power-efficient processing unit to process the primitive, power consumption can be reduced without quality and performance sacrifice.

20 Claims, 9 Drawing Sheets

HIGH QUALITY AND HIGH PERFORMANCE THREE-DIMENSIONAL GRAPHICS ARCHITECTURE FOR PORTABLE HANDHELD DEVICES

RELATED APPLICATIONS

The present application is a divisional of and claims the benefit of U.S. patent application Ser. No. 10/667,098, filed Sep. 18, 2003, still pending, entitled "HIGH QUALITY AND HIGH PERFORMANCE THREE-DIMENSIONAL GRAPHICS ARCHITECTURE FOR PORTABLE HANDHELD DEVICES," naming Bruce Holmer as the inventor, assigned to the assignee of the present invention. That application is incorporated herein by reference in its entirety and for all purposes.

FIELD OF THE INVENTION

The invention generally relates to computer systems, and more particularly relates to computer graphics triangle setup and rasterization units designed to achieve optimal power savings.

BACKGROUND OF THE INVENTION

Battery-operated and portable handheld devices that perform real-time Three-Dimensional (3D) imaging such as Personal Digital Assistants (PDAs), cellular phones, and handheld electronic games have become enormously popular. Their popularity is fueled in part by the available network connectivity options. Wireless data services now enable a new generation of high-performance, low-power-consumption handheld devices to access network-centric applications and content anywhere, anytime. As a result, these handheld devices, in addition to having the capability to provide mobile phone services, are capable of supporting 2-way video, sharing pictures and video clips, providing a rich web experience, and more.

As mobile applications become richer and more complex, the ability to optimally process multimedia becomes a necessity on handheld devices such as PDAs and smart phones. Applications such as video mail, mapping services, reading PDF files, and 3D graphics-rich games all require high quality and performance graphics and multimedia capabilities. These capabilities enable new applications that benefit from rich images and system performance in ways that were previously unavailable to most handheld users. These portable handheld devices face the challenge of providing a compelling user experience while reducing overall system energy consumption and cost. Traditionally, portable handheld devices have lower-performance components than desktop Personal Computers (PCs) primarily because of the power limitations inherent in battery-operated handheld devices.

In general, the rendering of 3D objects can be extremely computation and power intensive and therefore is not conducive to battery-operated handheld devices. 3D objects and surfaces are approximated as connected polygons, usually triangles. Greater realism can be obtained by using a larger number of smaller triangles to approximate the object as well as by using texture maps to more accurately render the surface material features. The rendering of each triangle requires the execution of multiple complex calculations. As the number of triangles increases, the complexity and power consumption of the logic that performs these calculations also increases. 3D graphics applications continue to gain popularity as higher quality and performance applications emerge.

U.S. Pat. No. 6,473,089 entitled "Method and Apparatus For A Video Graphics Circuit Having Parallel Pixel Processing" (hereinafter the '089 patent) teaches a video graphics circuit for parallel processing of 3D graphics pixel information. The video graphics circuit of the '089 patent includes a set-up engine, an edge-walker circuit, a span-processing circuit, and a plurality of pixel-processing circuits. The plurality of pixel-processing circuits allows the parallel processing of pixel parameters. While the '089 patent may teach a video graphics circuit with improved performance, it does not address the issue of power conservation. As a result, the graphics circuit of the '089 patent is not suitable for use in battery-operated portable handheld devices where power conservation is a crucial consideration.

U.S. Pat. No. 6,222,550 entitled "Multiple Triangle Pixel-Pipelines With Span-Range Pixel Interlock For Processing Separate Non-Overlapping Triangles for Superscalar 3D Graphics Engine" (hereinafter the '550 patent) teaches a 3D graphics processor with parallel triangle pixel pipelines to allow entire triangles to be processed in parallel. Also, the triangle pixel pipeline can process adjacent pixels in the triangle at the same time. Like the '089 patent, the '550 patent teaches a video graphics circuit with improved performance, it does not address the issue of power conservation. As a result, the graphics circuit of the '550 patent is also not suitable for use in battery-operated portable handheld devices where power conservation is a crucial consideration.

Thus, a need exists for a high quality and high performance 3D graphics architecture suitable for portable handheld devices where power consumption is a crucial consideration.

SUMMARY OF THE INVENTION

Accordingly, the present invention provides a high quality and high performance 3D graphics architecture suitable for portable handheld devices where power consumption is a crucial consideration.

The present invention meets the above need with a 3D graphics architecture implementing graphics engine that is coupled to memory and a Central Processing Unit (CPU). The graphics engine comprises a primitive setup engine that is coupled to a rendering/rasterization engine. The primitive setup engine receives data related to graphics primitives from memory. The primitive setup engine includes a primitive classification circuit that is used in classifying primitives. Based on a classification, the primitive setup engine selects a processing mode to compute setup equations for the primitive to minimize power consumption without sacrificing quality and performance. The rendering/rasterization engine generally performs pixel rasterization of the primitive.

In accordance to the present invention, the primitive is classified based on its size and other characteristics. A primitive is classified as either small and well-behaved, large, or misbehaved. In classifying the behavior of a primitive, the classification criteria utilized include but are not limited to size, texture, width, and depth.

A number of embodiments of the graphics engine describing various implementations of the above general concept are presented. Other additional features are also described.

All the features and advantages of the present invention will become apparent from the following detailed description of its preferred embodiments whose description should be taken in conjunction with the accompanying drawings.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. While the following detailed description of the present invention is related to three-dimensional (3D) graphics and portable handheld devices, it is to be appreciated that the present invention is also applicable to two-dimensional graphics and other types of computing/processing devices.

The 3D graphics architecture in accordance with the present invention incorporates a module/circuit to classify polygons by size and other characteristics. In the preferred embodiment, the polygons are triangles. In general, small and well-behaved triangles can be processed using low-precision units with power efficient circuitry without any quality and performance sacrifice (e.g., realism, resolution, etc.). Based on the classification, either a low-precision unit with a more power-efficient circuitry or a high-precision unit that requires more power are selectively turned on to carry out the rendering/rasterization process. In one embodiment, high-precision unit may be separate from a low-precision unit. Alternatively, a high-precision unit can be reconfigured by disabling and/or clock gating a subset of circuitry to become a low-precision unit. By classifying the primitives and selecting the more power-efficient processing unit to process the primitive, power consumption can be minimized without quality and performance sacrifice. The 3D graphics architecture can be implemented by various embodiments which are described in greater detail below.

It is clear that the present invention can be generalized to cover any data path or data pipeline that processes data in sequence. The data (e.g., a macroblock of MPEG video) being processed are classified and depending on its classification, a data path that is most appropriate (e.g., in terms of power efficiency) is configured (from a configurable data path) or selected (from a plurality of data paths) to process the classified data without any degradation of quality and performance.

Figure 1:
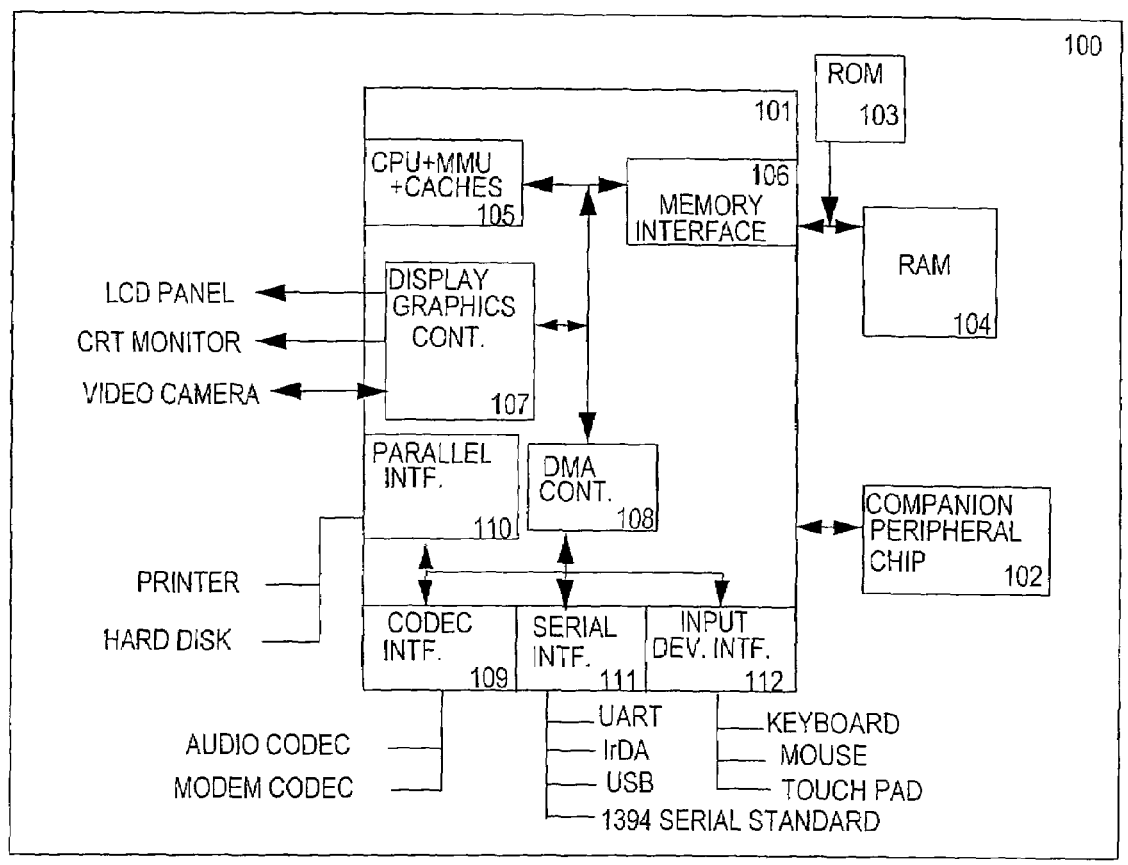
FIG. 1 illustrates, for example, a high-level diagram of an portable hand-held device 100 which implements the present invention.

Reference is now made to FIG. 1 which illustrates, as an example, a high-level diagram of computer system 100 in which the present invention may be implemented or practiced. More particularly, computer system 100 may be a laptop or hand-held computer system. It is to be appreciated that computer system 100 is exemplary only and that the present invention can operate within a number of different computer systems including desktop computer systems, general-purpose computer systems, embedded computer systems, and others.

As shown in FIG. 1, computer system 100 is a highly integrated system which includes of integrated processor circuit 101, peripheral controller 102, read-only-memory (ROM) 103, and random access memory (RAM) 104. The highly integrated architecture allows power to be conserved. Peripheral controller 102 is optional if there is a need to interface with complex and/or high pin-count peripherals that are not provided in integrated processor circuit 101.

While peripheral controller 102 is connected to integrated processor circuit 101 on one end, ROM 103 and RAM 104 are connected to integrated processor circuit 101 on the other end. Integrated processor circuit 101 comprises a processing unit 105, memory interface 106, graphics/display controller 107, direct memory access (DMA) controller 108, and core logic functions including encoder/decoder (CODEC) interface 109, parallel interface 110, serial interface 111, and input device interface 112. Processing unit 105 integrates a central processing unit (CPU), a memory management unit (MMU), together with instruction/data caches.

CODEC interface 109 provides the interface for an audio source and/or modem to connect to integrated processor circuit 101. Parallel interface 110 allows parallel input/output (I/O) devices such as hard disks, printers, etc. to connect to integrated processor circuit 101. Serial interface 111 provides the interface for serial I/O devices such as Universal Asynchronous Receiver Transmitter (UART), Universal Serial Bus (USB), and Firewire (IEEE 1394) to connect to integrated processor circuit 101. Input device interface 112 provides the interface for input devices such as keyboard, mouse, and touch pad to connect to integrated processor circuit 101.

DMA controller 108 accesses data stored in RAM 104 via memory interface 106 and provides the data to peripheral devices connected to CODEC interface 109, parallel interface 110, serial interface 111, or input device interface 112. DMA controller 108 also sends data from CODEC interface 109, parallel interface 110, serial interface 111, and input device interface 112 to RAM 104 via memory interface 106. Graphics/display controller 107 requests and accesses the video/graphics data from RAM 104 via memory interface 106. Graphics/display controller 107 then processes the data, formats the processed data, and sends the formatted data to a display device such as a liquid crystal display (LCD), a cathode ray tube (CRT), or a television (TV) monitor. In computer system 100, a single memory bus is used to connect integrated processor circuit 101 to ROM 103 and RAM 104.

Figure 2:
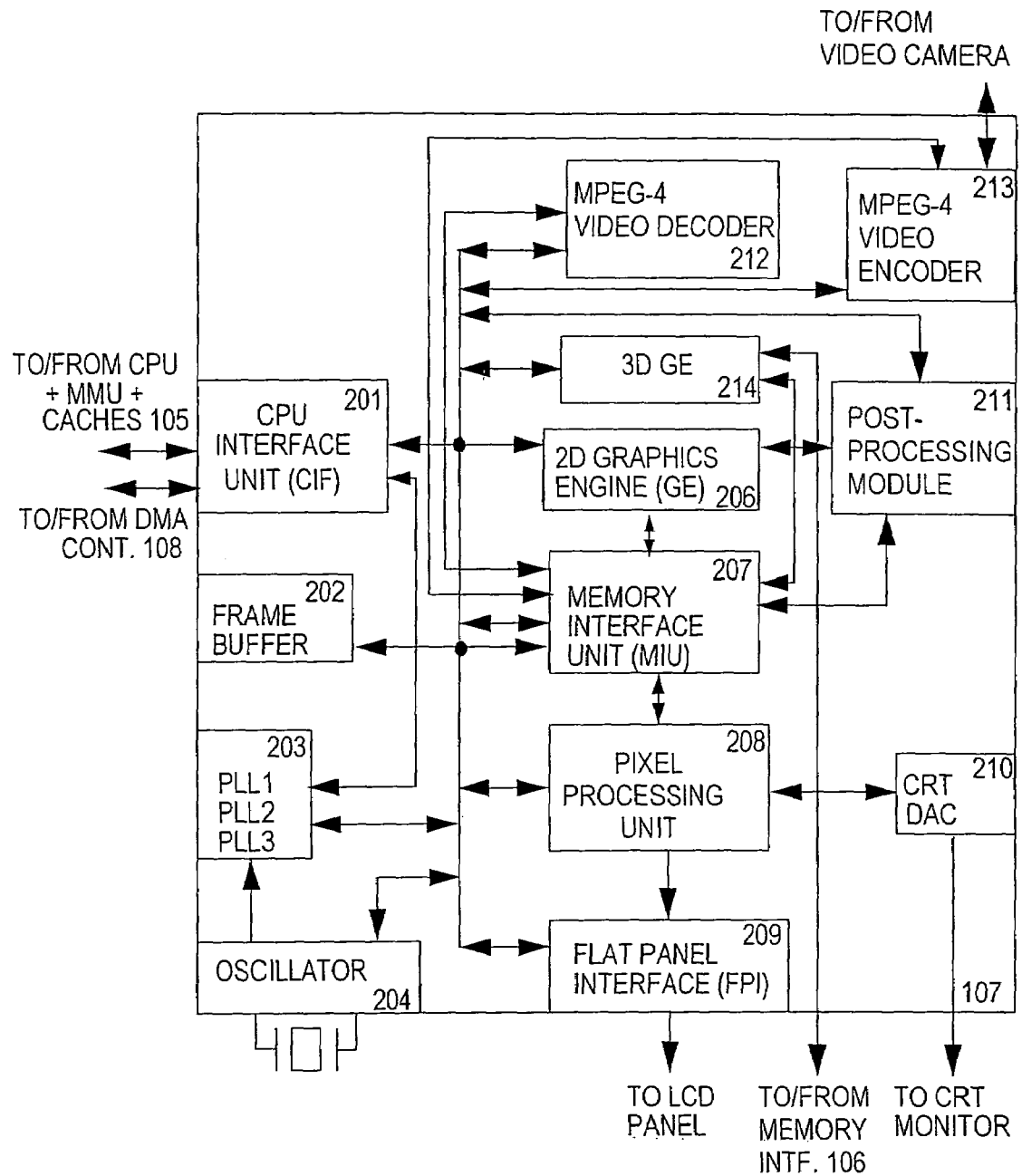
FIG. 2 illustrates in greater detail graphics/display controller 107 of portable hand-held device 100.

The present invention is implemented as part of graphics/display controller 107. Reference is now made to FIG. 2 illustrating in greater detail graphics/display controller 107. In general, graphics/display controller 107 comprises CPU Interface Unit (CIF) 201, SRAM 202, Phase Lock Loop (PLL) circuit 203, oscillator 204, pixel processing logic 208, two-dimensional (2D) Graphics Engine (GE) 206, Memory Interface Unit (MIU) 207, Flat Panel Interface (FPI) 209, CRT Digital-to-Analog Converter (DAC) 210, post-processing module 211, MPEG-4 video decoder 212, MPEG-4 video encoder 213, and 3D GE 214. Graphics/display controller 107 further includes a video input port to accommodate a video camera. CIF 201 provides the interface to processing unit 105 and DMA controller 108. Accordingly, CIF 201 routes requests and video/image data received from processing unit 105 to the desired destination. In particular, CIF 201 sends register read/write requests and memory read/write requests from the host CPU processing unit 105 and DMA controller 108 to the appropriate modules in graphics/display controller 107. For example, memory read/write requests are passed on to MIU 207 which in turn reads/writes the data from/to the frame buffer in SRAM 202. CIF 201 also serves as the liaison with DMA controller 108 to fetch data from system memory (ROM 103 and RAM 104) and provides the data to GE 206 and MIU 207. Further, CIF 201 has a number of control registers which can be programmed by the host CPU in processing unit 105 to control the MPEG post-processing process (e.g., the content of some of the control registers may be used to configure MPEG-4 decoder 212). CIF 201 also passes compressed video/image bitstream to MPEG-4 decoder 212 to perform image construction/decompression. CIF 201 further passes uncompressed video/image bitstream received from a source connected to codec interface 109 or serial interface 111 to MPEG-4 encoder to perform compression before the compressed bitstream can be transmitted to a device connected directly or remotely to integrated processor circuit 101.

The frame buffer in SRAM 202 is used to store the pixmap (i.e., a pixel pattern mapped into the frame buffer) of the image to be displayed on the monitor as well to act as a temporary buffer for various purposes. Additionally, SRAM 202 may have memory allocated for video buffers and transactional registers. 2D GE 206 processes graphics/video image data which is then stored in the buffer in SRAM 202 based on commands issued by the host CPU. GE 206 performs graphics operations (e.g., BitBLTs and ROPs, area fills, line drawing) and provides hardware support for clipping, transparency, rotation, color expansion, and others. GE 206 through a built-in Stretch Block Transfer (STRBLT) function further performs video image expansion, progressive scanning conversion, YcbCr (YUV) to RGB colorspace conversion, etc. In short, 2D GE 206 frees processing unit 105 from the video/graphics display rendering function to allow processing unit 105 to perform time-critical or real-time operations.

3D GE 214 implements the present invention. Under the commands of the host CPU, 3D GE 214 carries out the processing and rendering of 3D graphics for display. In general, 3D GE 214 sequentially processes 3D graphics in a data pipeline (a.k.a. data path) fashion which include but are not limited to the following functions: fetching primitive vertex information, sorting the vertex information, calculating the primitive area and classifying the primitive, using the area calculation and/or primitive classification to select or configure the appropriate (e.g., most power efficient) circuitry for processing 3D graphics, calculating the initial value and gradient for pixel position and attributes, calculating position and attributes value for each pixel in the triangle primitive, performing perspective division, retrieving texels data required by filter mode from texture cache, combining texture and diffuse colors to produce new diffuse color (dc), performing alpha, depth, and stencil testing, and combine dc with pixel colors from frame buffer 202 to generate the rendered 3D data. 3D GE 214 then provides the processed 3D to frame buffer 202. Except for functions related to the present invention such as the calculation of primitive area, the classification the primitive, and the subsequent selection or configuration of an appropriate circuitry to process 3D graphics data, the remaining functions performed by 3D GE 214 are generally well-known and are performed in most if not all commercially available 3D graphics engines.

MIU 207 controls all read and write transactions from/to the frame buffer, video buffers, and transactional registers in SRAM (frame buffer) 202. Such read and write requests may come from the host CPU via CIF 201, 2D GE 206, 3D GE 214, pixel processing logic 208, FPI 209, etc. In addition, MIU 207 performs tasks associated with memory addressing, memory timing control, and others. Post-processing module 211 removes blocking and ringing artifacts from decompressed MPEG video image data to improve the quality of the decompressed video data. The decompressed MPEG video image data can be received from, for example, an optical media player via serial interface 111 or MPEG-4 decoder 212. The filtered video image data is then sent to SRAM 202.

Pixel processing logic 208 retrieves video/graphics data from the buffers in SRAM 202 via MIU 207, serializes the image data into pixels, and formats the pixels into predetermined formats before outputting them to FPI 209 or CRT DAC 210. Accordingly, pixel processing logic 208 generates the required horizontal and vertical display timing signals, memory addresses, read requests, and control signals to access image data stored in SRAM 202. If the display device involved is a LCD, pixel data from pixel processing logic 208 is sent to FPI 209 before being passed on to the LCD. FPI 209 further processes the data by further adding different color hues or gray shades for display. Additionally, depending on whether a thin film transistor (TFT) LCD (a.k.a., active matrix LCD) or a super twisted nematic (STN) LCD (a.k.a., passive matrix LCD) is used, FPI 209 formats the data to suit the type of display. Furthermore, FPI 209 allows color data to be converted into monochrome data in the event a monochrome LCD is used. Conversely, if the display device is a cathode ray tube (CRT), pixel data is provided to CRT digital-to-analog converter (DAC) 210 prior to being sent to the CRT. CRT DAC 210 converts digital pixel data from pixel processing logic 208 to analog Red, Green, and Blue (RGB) signals to be displayed on the CRT monitor.

Figure 3:
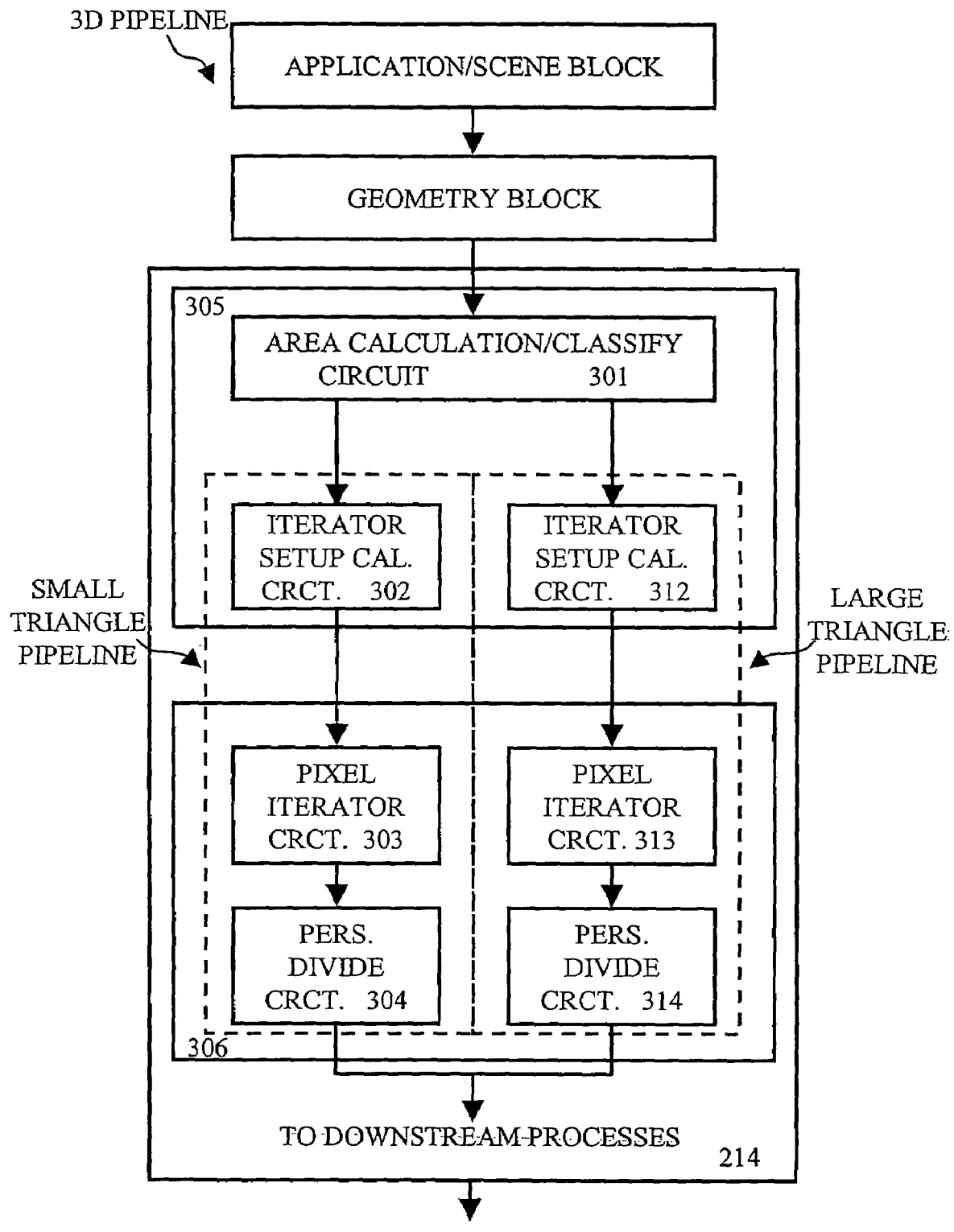
FIG. 3 illustrates the relevant components of a first embodiment of 3D GE 214 which implements the present invention.

Referring now to FIG. 3 illustrating the relevant components of a first embodiment of 3D GE 214 which implements the present invention. As shown in FIG. 3, 3D GE 214 includes area calculation/classify circuit 301, iterator setup calculation circuit 302, iterator setup calculation circuit 312, pixel iterator circuit 303, pixel iterator circuit 313, perspective divide circuit 304, and perspective divide circuit 314. Area calculation/classify circuit 301, iterator setup calculation circuit 302, and iterator setup calculation circuit 312 form triangle setup engine 305. Pixel iterator circuit 303, pixel iterator circuit 313, perspective divide circuit 304, and perspective divide circuit 314 form rasterizing/rendering engine 306. However, it should be noted that instead of being part of triangle setup engine 305 as shown in FIG. 3, iterator setup calculation circuit 302 and iterator setup calculation circuit 312 can also be made part of rasterizing/rendering engine 306 as shown by the broken-line box. As shown in FIG. 3, while iterator setup calculation circuit 302, pixel iterator circuit 303, and perspective divide circuit 304 are connected together to form a first path designed to handle small and well-behaved triangles, iterator setup calculation circuit 312, pixel iterator circuit 313, and perspective divide circuit 314 are connected together to form a second path designed to handle large or misbehaved triangles. In this embodiment, after a triangle classification is determined, the triangle is processed by either the first or the second path. The hardware in the path that is not selected can be turned off (not clocked) to conserve power.

To generate 3D graphics, a 3D application creates a scene (e.g., a 3D animation software used in PC games). Each scene contains a number of objects that are made up by connecting parametric surfaces. Each parametric surface is subdivided into smaller and plainer elements called primitives. A primitive can be any solid or patterned shape such as polygons, spheres, cylinders, free-form surfaces, and others. Usually, primitives are triangles which are one type of polygons. Each primitive, which is represented by a data structure in a database, is associated with vertex coordinates (e.g., from three triangular vertices) and attributes to give it the desired color, shade, texture, transparency, etc. In the next phase of the 3D pipeline, known as geometric processing, the primitive database is mathematically transformed to image space. Such transformation may involve translation, rotation, clipping, projection, and scaling. Lighting and atmospheric effects are also added to the primitives. Geometric processing produces image-space primitives described by their vertex coordinates, color, depth, texture, and other attributes.

3D GE 214 receives the image-space primitives produced by the geometric process and carries out the rasterization phase of the 3D pipeline. While the embodiments of the present invention are designed for triangular shaped primitives, it should be clear that the present invention is applicable to other shaped primitives as well. In general, while triangle setup engine 305 produces adjusted pixel positions and attribute gradients for each triangle, rasterizing/rendering engine 306 generates all the pixel attributes within the triangle using the information generated by triangle setup engine 305. Rasterizing/rendering engine 306 performs edge walking to determine the pixel locations along the edges and then span processing using pixel locations along the dominant edge as the starting points to render pixel locations and attribute values for pixels along the scan lines inside the triangle primitive. Examples of attributes include color, depth, texture coordinates, blending, etc. The final rendering of each pixel is a composite of all the attributes as dictated by the application. As such, rasterizing/rendering engine 306 carries out a large number of computations. Each pixel's attributes after some additional downstream processes is then sent to frame buffer in SRAM 202 for subsequent display.

As discussed above, triangle setup engine 305 includes but is not limited to area calculation/classify circuit 301, iterator setup calculation circuit 302, and iterator setup calculation circuit 312. In accordance with the present invention, area calculation/classify circuit 301 computes XP according to:

$$XP = [(dx10 * dy20) - (dx20 * dy10)] \quad (1)$$

where $dxNM = (X_N - X_M)$ and $dyNM = (Y_N - Y_M)$

Figure 4:
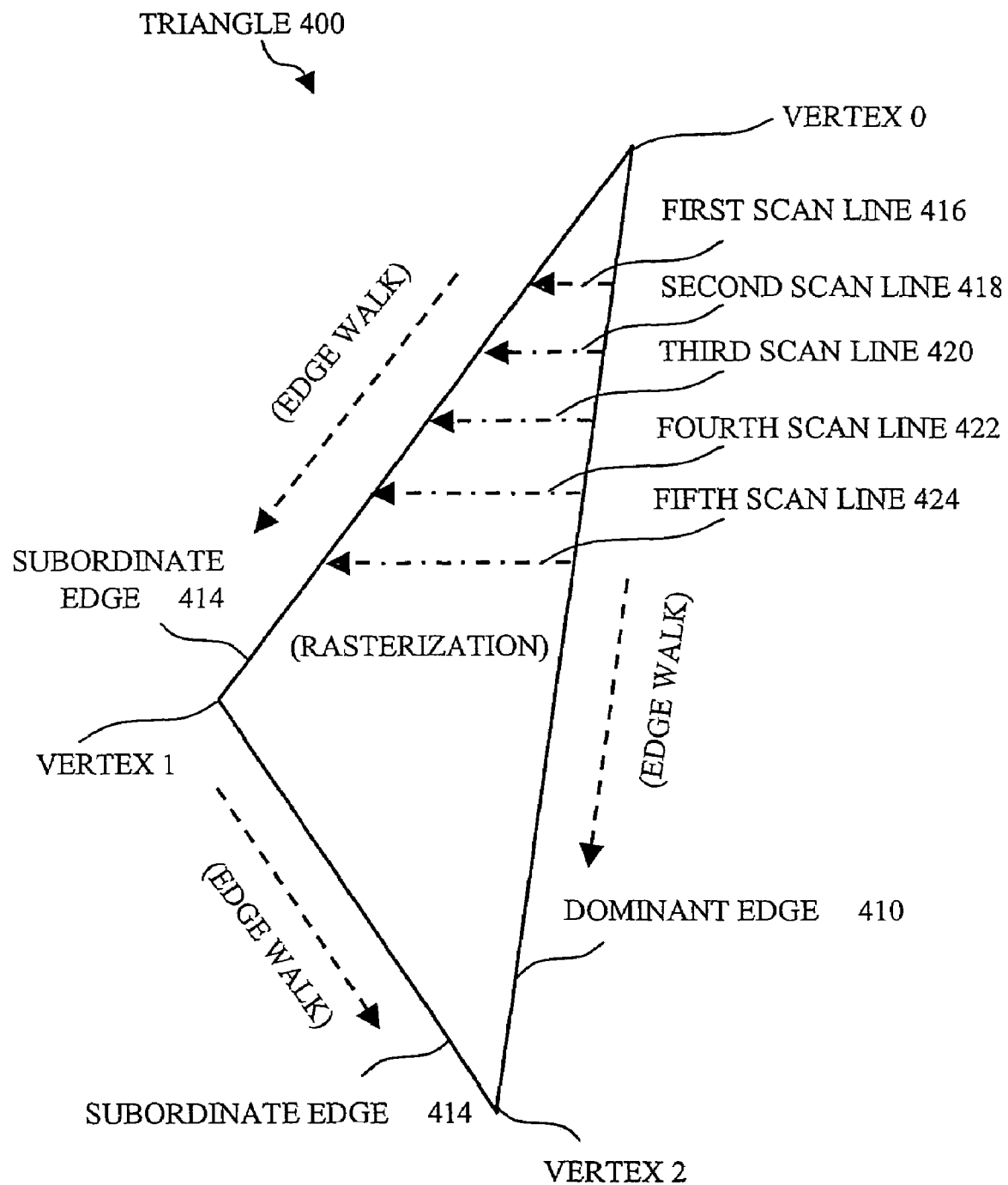
FIG. 4 illustrates, as an example, triangle 400 with dominant edge 410 of triangle 400 and many scan lines within triangle 400 that are used in the rasterizing/rendering process.

|XP|/2 is equal to the area of the triangle at hand. Before equation (1) can be computed, area calculation/classify circuit 301 determines the dominant edge of the present triangle. A dominant edge of a triangle is defined as the edge connecting the vertex having the smallest Y-coordinate to the vertex having the largest Y-coordinate. Based on the dominant edge and its corresponding connecting vertices, area calculation/classify circuit 301 labels the vertex having the largest Y-coordinate vertex 2, the vertex having the smallest Y-coordinate vertex 0, and the remaining vertex 1. Reference is now made to FIG. 4 which illustrates, as an example, a dominant edge 410 of triangle 400 and a way to label the vertices of a triangle in accordance with the present invention. FIG. 4 also illustrates the many scan lines within triangle 400 that are used in the rasterizing/rendering process.

Area calculation/classify circuit 301 classifies a primitive triangle as small or large based on a predetermined criterion. Area calculation/classify circuit 301 also classifies each triangle as "well behaved" or "misbehaved" according to other predetermined criteria. An example of a "misbehaved" triangle is one that is too narrow. It is important to determine whether a triangle is small and well-behaved because calculating triangles that are small and well-behaved requires less precision than calculating large or misbehaved triangles. In general, a more precise triangle calculator requires larger multipliers and/or adders and consequently more logic gates which consume more power. Conversely, a less precise calculator requires smaller multipliers and/or adders or other mathematical logic circuits. The use of fewer logic gates translates to less power consumption. Hence, in accordance with the present invention, by correctly classifying a triangle primitive and selecting a calculator that consumes less power and yet sacrificing only "redundant" precision, power can be conserved with little or no quality and performance loss in the pixel rendering/rasterization process.

Table 1 summarizes, as examples, a few classification criteria that are implemented by area calculation/classify circuit 301 to determine whether a triangle is small and/or well-behaved. As shown in Table 1, failing the "size" criterion indicates that a triangle is large, failing the "texture" criterion indicates that the triangle spans too large of a distance in the texture map and therefore is misbehaved, failing the "width" criterion indicates that the triangle is narrow and therefore is misbehaved, and failing the "depth" criterion indicates that the triangle spans too large of a depth range and therefore is misbehaved. Other criteria (not shown in Table 1) may be established depending on a given application. It should be noted that the classification rules require the minimum and maximum for the X, Y, U, V, and 1/w values of the vertices. In other words, $X_{min}$=min (X0, X1, X2), $X_{max}$=max (X0, X1, X2), $U_{min}$=min (U0, U1, U2), etc. If all the criteria shown in Table 1 are satisfied, a triangle is small and well-behaved. If a criterion is not satisfied, the triangle is large or misbehaved.

TABLE 1

| Classification Criteria | | Exemplary Threshold Value |
|---|---|---|
| Size | $X_{max} - X_{min}$ < threshold and $Y_{max} - Y_{min}$ < threshold | 32 |
| Texture | $U_{max} - U_{min}$ < threshold and $V_{max} - V_{min}$ < threshold | 1 |
| Width | dy20 * dy20 < threshold * |XP| | 16 |
| Depth | $((1/w)_{max} - (1/w)_{min})$ < threshold * $(1/w)_{max}$ | 1/32 |

To meet the objective of the present invention, the classification process cannot use up a significant fraction of the saved power. Steps are taken before classification computations to simplify and hence reduce the processing power required. A few examples are provided below. For example, texture and depth coordinates (u,v) and 1/w, respectively, are floating-point values. The classification criteria do not require full precision during evaluation. To dramatically simplify the computation and reduce the power required to evaluate the texture and depth criteria, only a limited number of the most significant bits of the mantissa need to be used in the computation.

Other power conservation measures can also be implemented. The computation of the size, texture, and depth classification criteria requires the determination of the minimum and maximum values for each classification criterion of three triangle vertices. In other words, for each classification criterion, three values from the three vertices are involved. Preferably, the determination of minimum and maximum values is carried out using 3-input minimum and maximum circuits (e.g., 3-input comparator circuits) optimized for power conservation. In general, subtraction and comparison operations involving fixed-point numbers with limited precision requirement can be performed with little power. As shown in the Table 1, multiplication operations using a threshold value are required in the computation of the width and depth classification criteria. By utilizing threshold values that can be represented in terms of power of two (e.g., 32), multiplication operations can be performed by power saving bit shifting circuits. To carry out the (dy20*dy20) operation in computing the width classification criterion, a special squaring circuit, which is generally much smaller and consumes less power than a general multiplier circuit, can be used. Alternatively, some of the least-significant bits of the number dy20 can be dropped in the computation of (dy20*dy20).

If area calculation/classifying circuit 301 determines that a triangle is small and well-behaved, the triangular vertex information and attributes are provided to iterator setup calculation circuit 302. Conversely, if area calculation/classifying circuit 301 determines that a triangle is large or misbehaved, the triangular vertex information and attributes are provided to iterator setup calculation circuit 312.

Iterator setup calculation circuits 302 and 312 compute parameters, such as initial attribute values and their gradients, required by the rasterizing/rendering engine 306. More specifically, iterator setup calculation circuit 302 performs well-known setup equations to determine, for example, the change in attribute for a horizontal increment/decrement along a scan line or the change in attribute for vertical increment/decrement between adjacent span lines. The vertical increment/decrement to the next adjacent scan line is made along the dominant edge of the current triangle, such as dominant edge 410 shown in FIG. 4. Hence the slope and its inverse of the dominant edge are used in the derivation of the setup equations. The equations that iterator setup calculation circuits 302 and 312 use in its computations are presented below.

Assuming that a pixel attribute is represented by a linear function f(x,y). Stepping in horizontal increment along a scan line, the horizontal difference between a pixel attribute value and the next pixel attribute value is represented by:

$$\partial f/\partial x = (df10 * dy20 - df20 * dy10)/XP \quad (2)$$

where XP is calculated from equation (1).

Stepping in vertical increment from one scan line to the next adjacent scan line along the dominant edge, the difference in coordinates can be shown geometrically to be: yi=(yi+1) and xi=(xi+si20) where xi and yi are integer pixel coordinates and si20=⌊dx20/dy20⌋ (i.e., the integer "floor" inverse of the dominant edge's slope). The x-coordinate is dependent on the inverse of the slope of the dominant edge. Hence, the vertical difference between an attribute value of a current scan line and that of the next scan line attribute value is represented by:

$$df = si20 * \partial f/\partial x + \partial f/\partial y \quad (3)$$

where $\partial f/\partial y = [df20 * dx10 - df10 * dx20]/XP$

Iterator setup calculation circuits 302 and 312 pass vertex information and attribute gradients to rasterizing/rendering engine 306 which, as discussed earlier, includes but is not limited to pixel iterator circuit 303, interator circuit 313, perspective divide circuit 304, and perspective divide circuit 314. Pixel iterator circuits 303 and 313 perform edge walking to establish pixel locations along the triangle edges. Using the established pixel locations along the dominant edge as starting points of the scan lines, pixel iterator circuit 303 and 313 determine the x-y location coordinates and attribute values of all pixels along each scan line through iteration of equation:

$$f(xi \pm 1, yi) = f(xi, yi) \pm \partial f/\partial x \quad (4)$$

wherein whether an addition or subtraction depends on the spanning direction. Edge walking and span processing are well-known processes.

The scan line rasterization process (e.g., edge walking and span processing) performed by pixel iterator circuit 303 is aided by the use of well-known equations. The initial values for the integer x and y coordinates and the associated attribute values are determined using the following equation:

$$f(xi, yi) = f0 + (yi - y0) * \partial f/\partial y + (xi - x0) * \partial f/\partial x \quad (5)$$

where yi=⌊y0⌋ and xi=x0+si20*(yi-y0),
  if dx20*(yi-y0)-dy20*(xi+1-x0)>=0
  then xi is incremented by one (1).

Perspective divide circuit 304 and 314 provide the perspective correction needed by texture coordinates (u,v). When perspective divide circuits 304 and 314 receive pixel attribute values from pixel iterator circuit 303 and pixel iterator circuit 313, respectively, for each pixel, perspective divide circuits 304 and 314 divide the linearly interpolated products of the texture coordinates and the depth value (i.e., u/w and v/w) by the linearly interpolated depth value (i.e., 1/w). Perspective divide circuits 304 and 314 then send a list of the pixel location coordinates and their individual attributes to other circuits (not shown) in the rasterization/render process to perform some well-known processes such as texture lookup and blending before sending the information to frame buffer in SRAM 202 for subsequent display.

General designs of triangle setup engines (without the use of an area calculation/classification circuit and other related components) and rasterization/rendering engines have been described in various publications such as "A Superscalar 3D Graphics Engine" by A. Wolfe and D. Noonburg, Proc. Of 32nd Annual International Symposium on Microarchitecture, p. 50, November 1999. Additionally, general designs of triangle setup engines (without the use of an area calculation/classification circuit and other related components) and rasterization/rendering engines have been described in various US patents including the '089 patent and the '550 patent described earlier. These materials are incorporated herein by reference in their entirety.

Hence, the main aspect of the first embodiment of the present invention is the use of two paths: a first path for processing small and well-behaved triangles using hardware of less precision, less complexity, and consequently requiring less power to operate and a second path for processing large or misbehaved triangles using hardware of greater precision, more complexity, and consequently requiring more power to operate. The hardware of the second path for processing large or misbehaved triangles can be those conventional hardware currently used in commercially available 3D graphics engine to process triangles regardless of size and behavior. The main source of power conservation is realized when small and well-behaved triangles are processed and the circuitry associated with the large/misbehaved path is turned off (not clocked).

Simulations indicate that precision, quality, and performance requirements are met if the iterator setup floating point operations are done with a 24-bit mantissa for large or misbehaved triangles and 16-bit mantissa for small and well-behaved triangles wherein 6-bit exponents are used for both classification. The floating-point multiplication is performed using a well-known three-stage pipeline and the floating-point addition is performed using a well-known five-stage pipeline. The three-stage multiplicator and five-stage adder both have a throughput of one operation per cycle. The use of 16-bit mantissa floating-point multiplier and adder in iterator setup calculation circuit 302 of the first path reduces the iterator setup calculation power consumption by approximately 20%. On the other hand, power consumption savings resulted from the use of less precise and less complex hardware in pixel iterator circuit 303 and perspective divide block 304 are minimal mainly because the number of cycles spent on small triangles is less than a tenth of the number of cycles spent on large triangles.

Figure 5:
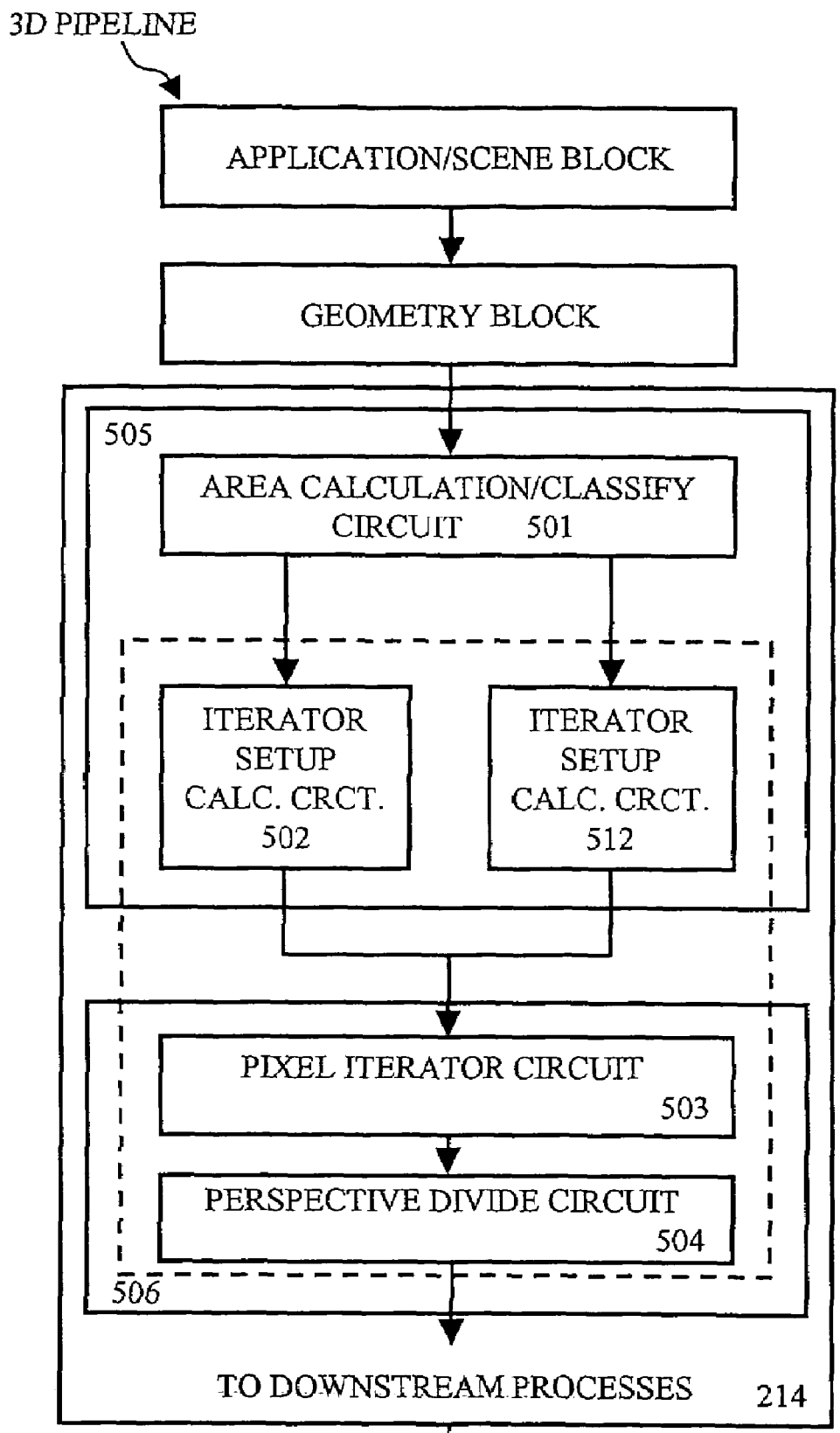
FIG. 5 illustrates the relevant components of a second embodiment of 3D GE 214 which implements the present invention.

Reference is now made to FIG. 5 illustrating the relevant components of a second embodiment of 3D GE 214 which implements the present invention. As shown in FIG. 5, 3D GE 214 includes area calculation/classify circuit 501, iterator setup calculation circuit 502, iterator setup calculation circuit 512, pixel iterator circuit 503, and perspective divide circuit 504. While iterator setup calculation circuit 502 is used for small and well-behaved triangles, iterator setup calculation circuit 512 is used for large or misbehaved triangles. In this embodiment, after a triangle classification is determined, the triangle is processed by either iterator setup calculation circuit 502 or iterator setup calculation circuit 512. The hardware in the path that is not selected can be turned off (not clocked) to conserved power. Pixel iterator circuit 503 and perspective divide circuit 504 are then used to process both small and well-behaved triangles and large or misbehaved triangles. In so doing, extra hardware required in the first embodiment for implementing pixel iterator circuit 313 and perspective divide circuit 314 are eliminated thereby saving the added costs. This may be a more desirable design solution because the use of these additional hardware may not significantly improve power savings.

Area calculation/classification circuit 501 is identical to area calculation/classification circuit 301. Iterator setup calculation circuit 502 is identical to iterator setup calculation circuit 302. Iterator setup calculation circuit 512 is identical to iterator setup calculation circuit 312. Pixel iterator circuit 503 is identical to pixel iterator circuit 313 (used in the large/misbehaved path of the first embodiment). Perspective divide circuit 504 is identical to perspective divide circuit 314 (used in the large/misbehaved path of the first embodiment). It should be noted that instead of being part of triangle setup engine 505 as shown in FIG. 5, iterator setup calculation circuit 502 and iterator setup calculation circuit 512 can also be made part of rasterizing/rendering engine 506 as shown by the broken-line box.

Simulations indicate that a performance gain can be realized by the use of parallel processing. For example, a 5% performance increase occurs if in iterator setup calculation circuit 502 (used for small and well-behaved triangles) an additional multiplier is added to a circuit already having a multiplier and an adder. This is because small triangles require a large proportion of floating-point operations per pixel generated.

Figure 6:
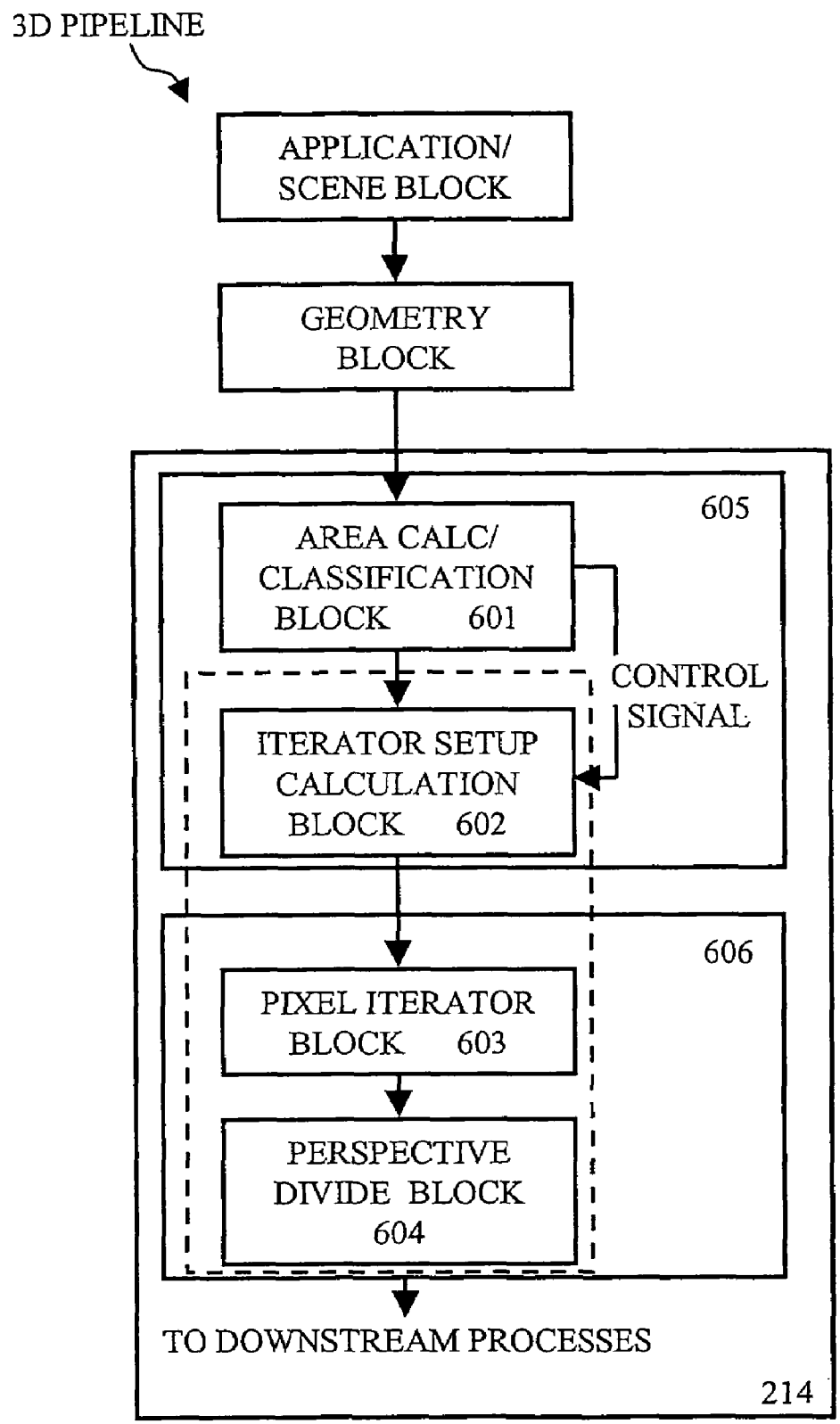
FIG. 6 illustrates the relevant components of a third embodiment of 3D GE 214 which implements the present invention.

Referring now to FIG. 6 illustrating the relevant components of a third embodiment of 3D GE 214 which implements the present invention. As shown in FIG. 6, 3D GE 214 includes area calculation/classify circuit 601, iterator setup calculation circuit 602, pixel iterator circuit 603, and perspective divide circuit 604. Iterator setup calculation circuit 602 can be configured dynamically to operate in a low-precision mode (e.g., when small and well-behaved triangles are involved) or in a high-precision mode (e.g., when large or misbehaved triangles are involved). More specifically, in a low-precision mode, iterator setup calculation circuit 602 disables (set to zero) one or more LSBs of the mantissa when processing of small and well-behaved triangles. Conversely, in a high-precision mode, iterator setup calculation circuit 602 uses the full width of the mantissa when processing large or misbehaved triangles. In this embodiment, after a triangle classification is determined, area calculation/classification circuit 601 generates control signals to indicate the classification of a triangle which is used in configuring iterator setup calculation circuit 602 to either low-precision mode or high-precision mode. This allows iterator setup calculation circuit 602 to be dynamically configured on a triangle by triangle basis to conserve power. Pixel iterator circuit 603 and perspective divide circuit 604 are then used to process both small and well-behaved triangles and large or misbehaved triangles.

Area calculation/classification circuit 601 is identical to area calculation/classification circuit 301. Pixel iterator circuit 603 is identical to pixel iterator circuit 313 (used in the large/misbehaved path of the first embodiment). Perspective divide circuit 604 is identical to perspective divide circuit 314 (used in the large/misbehaved path of the first embodiment). It should be noted that instead of being part of triangle setup engine 605 as shown in FIG. 6, iterator setup calculation circuit 602 can also be made part of rasterizing/rendering engine 606 as shown by the broken-line box.

Except for the capability to dynamically operate in dual low-precision and high-precision modes, iterator setup calculation circuit 602 is substantially similar to iterator setup calculation circuit 312 (used in the large/misbehaved path of the first embodiment). In one embodiment, by zeroing out the LSBs of the mantissa, the logic circuit associated with the LSBs cannot toggle between zero and one and therefore is not consuming power. In one embodiment, a full mantissa width of 24 bits is used for arithmetic logic circuits (e.g., multipliers, adders, etc.) of iterator setup calculation circuit 602 for processing large or misbehaved triangles which require higher precision hardware and a reduced mantissa width of 16 bits is used for arithmetic logic circuits of iterator setup calculation for processing small and well-behaved triangles which require less precision hardware. Other power savings configurations (e.g., number of enabled mantissa bits in high precision mode, number of disabled LSBs, etc.) as well as additional precision modes (e.g., involving different number of disabled LSBs) can also be used. Table 2 below illustrates a first exemplary multiplication between two binary numbers, a multiplier and the mantissa of a floating-point number, in which the full width (e.g., 24 bits) of the mantissa is used and a second exemplary multiplication between two binary numbers, a multiplier and the mantissa of a floating-point number, with 8 LSBs of the mantissa disabled.

TABLE 2

Example multiply operations of two binary numbers

| | | Hexadecimal | Binary |
|---|---|---|---|
| Example #1 | Mantissa | AAAAAA | 010101010101010101010101010 |
| | Multiplier | 3 | 11 |
| | Result | 1FFFFFE | 1111111111111111111111111110 |
| Example #2 | Mantissa | AAAA00 | 010101010101010100000000 |
| | Multiplier | 3 | 11 |
| | Result | 1FFFE00 | 11111111111111111000000000 |

As shown in example no. 1, because the width of the mantissa is used, all bits are enabled and therefore free to toggle between zero (0) and one (1) during calculation. By contrast, example no. 2 illustrates the scenario when the 8 LSBs of the mantissa are disabled and therefore not free to toggle to one (1). Although the end result of the multiplication operation in example no. 2 is less precise than that of example no. 1, it appears adequately accurate for processing small and well-behaved triangles.

Figure 7:
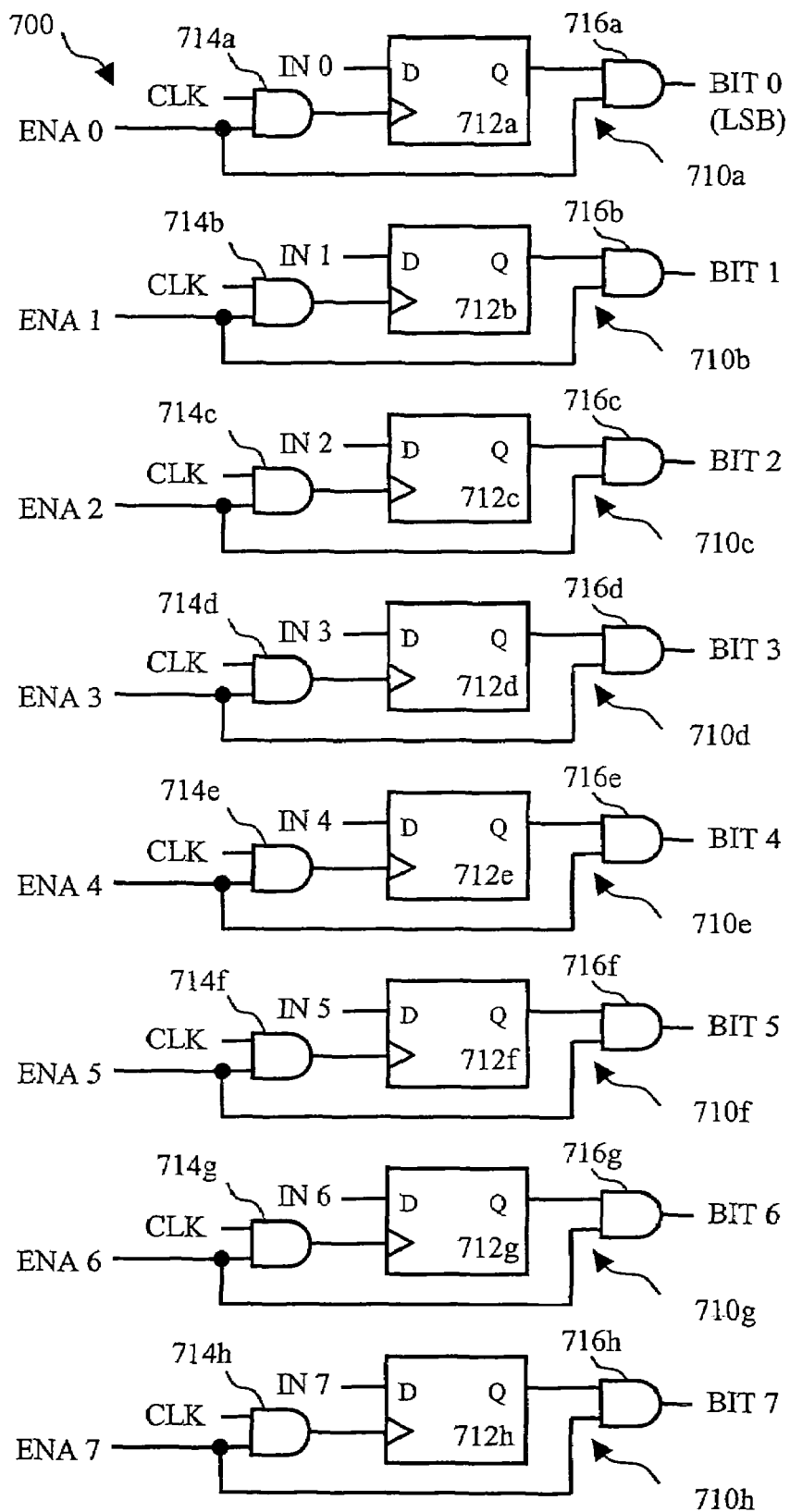
FIG. 7 illustrates, as an example, mantissa register 701 that can be implemented in iterator setup calculation circuit 602 to enable and disable the LSBs in high precision mode and low precision mode.

FIG. 7 illustrates, as an example, mantissa register 700 that can be implemented in iterator setup calculation circuit 602 to enable and disable the LSBs in high precision mode and low precision mode. As shown in FIG. 7, mantissa register 700 includes flip-flops 712a-712h, AND-gates 714a-714h, and AND-gates 716a-716h which are connected together to form register circuits 710a-710h. Each of register circuits 710a-710h, which are all identical, is designed to control a mantissa bit with register circuit 710a assigned to bit 0, the LSB, register circuit 710b assigned to bit 1, and so on. As such, mantissa register 700 is designed to control eight (8) mantissa bits. It should be clear that additional register circuits can be added to or removed from mantissa register 700 to control more or less mantissa bits.

The operation of register circuit 710a, which is representative of all register circuits 710a-710h, is described next. AND-gate 714a receives as inputs enable signal ENA 0 and clock signal CLK. AND-gate 714a provides its output as a clock input to flip-flop 712a which receives as data input signal IN 0. Flip-flop 712a only latches and passes input signal IN 0 as its output when both enable signal ENA 0 and clock signal CLK are active. The output of flip-flop 712a along with enable signal ENA 0 are provided as inputs to AND-gate 716a which ensures that its output BIT 0 is set to zero whenever ENA 0 becomes inactive. By not allowing clock signal CLK to cause BIT 0 to toggle between zero and one, the logic circuit associated with the LSBs cannot toggle between zero and one and therefore is not consuming power.

In one embodiment, enable signals ENA 0-ENA 7 are supplied by an 8-bit programmable control register located in area calculation/classification circuit 601 (not shown) whose content has been set by the control signal(s) generated by area calculation/classification circuit 601 after completing the calculation/classification process. For example, an active control signal indicating that a triangle is large or misbehaved sets the content of the 8-bit programmable control register to all ones (1's) and an inactive control signal indicating that a triangle is small and well-behaved sets the content of the 8-bit programmable control register to all zeros (0's). Signals IN 0-IN 7 are the eight mantissa LSBs that have been generated by arithmetic functional units (not shown). Instead, mantissa register 700 supplies its outputs BIT 0-BIT 7 to be used as the eight mantissa LSBs in iterator setup calculation circuit 602. It should be clear to a person of ordinary skill in the art that the present invention can easily extend from two precision modes to many more precision modes, for example, to process ultra-small, small, medium, and large triangles by varying the number of disabled mantissa LSBs. Table 3 is a truth table for an exemplary mantissa register 700.

TABLE 3

Truth table for control circuit

| "Zeroed" Mantissa Bits | ENA 7 | ENA 6 | ENA 5 | ENA 4 | ENA 3 | ENA 2 | ENA 1 | ENA 0 |
|---|---|---|---|---|---|---|---|---|
| None | 1 | 1 | 1 | 1 | 1 | 1 | 1 | 1 |
| BIT 0 (LSB) | 1 | 1 | 1 | 1 | 1 | 1 | 1 | 0 |
| BIT 0 & 1 | 1 | 1 | 1 | 1 | 1 | 1 | 0 | 0 |
| BIT 0 to 2 | 1 | 1 | 1 | 1 | 1 | 0 | 0 | 0 |
| BIT 0 to 3 | 1 | 1 | 1 | 1 | 0 | 0 | 0 | 0 |
| BIT 0 to 4 | 1 | 1 | 1 | 0 | 0 | 0 | 0 | 0 |
| BIT 0 to 5 | 1 | 1 | 0 | 0 | 0 | 0 | 0 | 0 |
| BIT 0 to 6 | 1 | 0 | 0 | 0 | 0 | 0 | 0 | 0 |
| BIT 0 to 7 | 0 | 0 | 0 | 0 | 0 | 0 | 0 | 0 |

Figure 8:
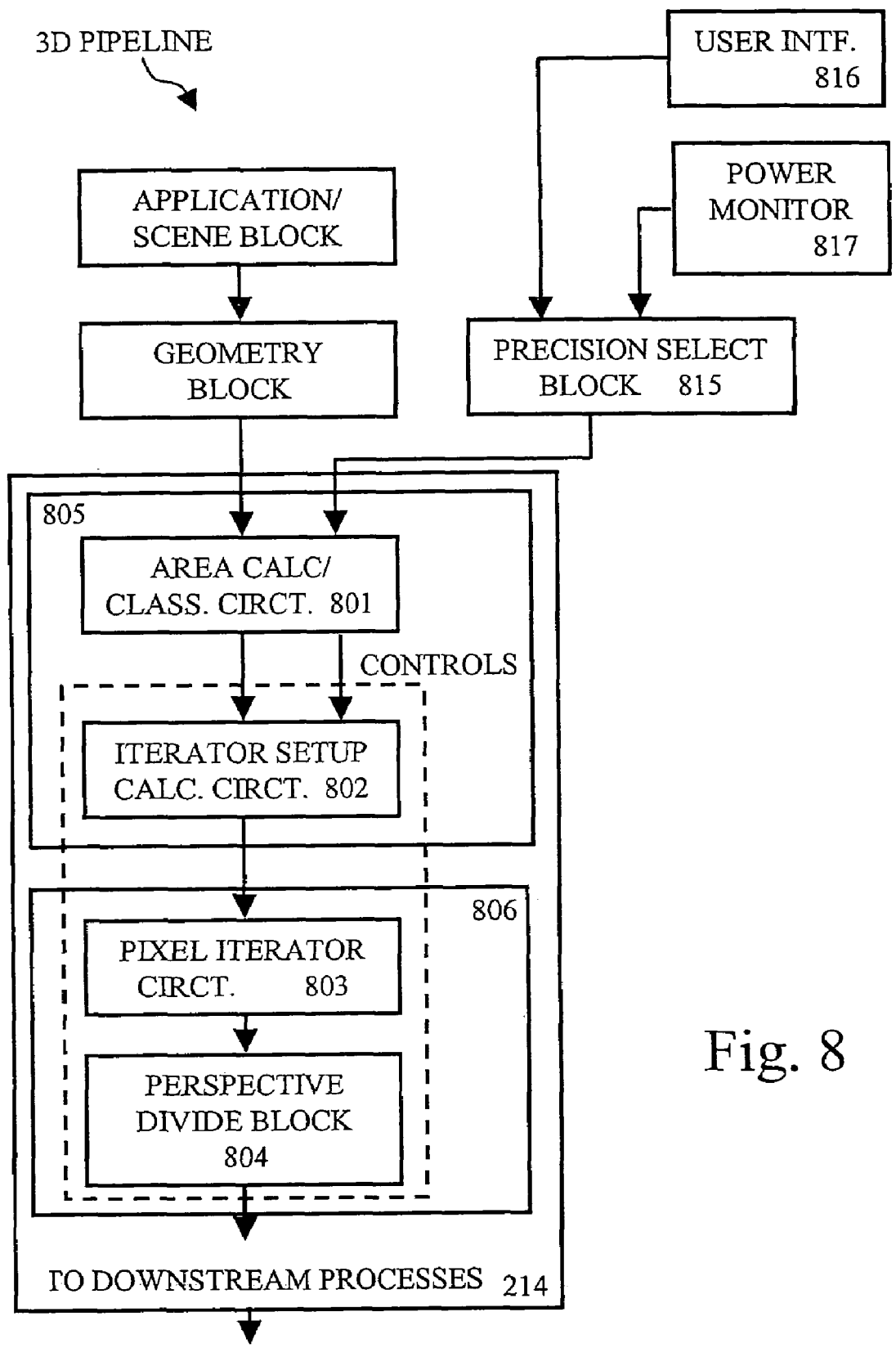
FIG. 8 illustrates the relevant components of a fourth embodiment of 3D GE 214 that implements the present invention.

Reference is now made to FIG. 8 which illustrates the relevant components of a fourth embodiment of 3D GE 214 that implements the present invention. As shown in FIG. 8, 3D GE 214 includes area calculation/classify circuit 801, iterator setup calculation circuit 802, pixel iterator circuit 803, and perspective divide circuit 804. Additionally, the current embodiment further includes precision select circuit 815 which is connected to user interface 816 and/or power monitor 817. Precision select circuit 815 may be external of 3D GE 214 (as shown in FIG. 8) or internal of 3D GE 214. User interface 816 allows a user to manually select a desired power level and accordingly an associated precision mode. User interface 816 may be a Graphical User Interface (GUI), a command line interface, a touch screen interface, a voice-activated interface, a menu-driven interface, a manual switch, etc. Hence, using user interface 816, the user may select a low-power low-precision mode to maximize battery life, a high-power high precision mode for better graphics quality and performance, or other precision modes by generating a select signal.

Generally, power monitor 817 monitors the available power remaining in the battery that powers portable handheld device 100 and then compares the available power level with the remaining operating time of an actively running application (e.g., a game, etc.) to determine the appropriate power level needed to ensure operation of portable handheld device 100 can continue until the conclusion of the running application. In one embodiment, power monitor 817 may be a state machine executing a stored power level vs. operating time algorithm using inputs from the battery, the CPU (indicating the remaining running time of the game), and others. The algorithm basically performs the comparison of the inputs (e.g., power available vs. time to completion of running application under the current precision mode), determines the remaining operation times under other available precision modes, and selects a precision mode that would ensure that the power available in the battery is sufficient to complete the application.

In one embodiment, precision select circuit 815 receives select signals from user interface 816 and/or power monitor 817 and generates a string of bits that represent the power and precision mode selected. Precision select signal circuit 815 also generates an indicator signal indicates whether user interface 816 or power monitor 817 have been activated (for example, when a new select signal is received from either modules). This bit string and the indicator signal are then provided to a control register (not shown but is described in greater detail below) inside area calculation/classification circuit 801.

Iterator setup calculation circuit 802 can be configured dynamically to operate in a low-precision mode (e.g., when small and well-behaved triangles are involved), in a high-precision mode (e.g., when large or misbehaved triangles are involved), and in other precision modes. More specifically, in a low-precision mode, iterator setup calculation circuit 802 disabled (set to zero) one or more LSBs of the mantissa when processing of small and well-behaved triangles. Conversely, in a high-precision mode, iterator setup calculation circuit 802 uses the full width of the mantissa when processing large or misbehaved triangles. Other precision modes involve the disablement of different numbers of LSBs of the mantissa. In the current embodiment, after a triangle classification is determined, area calculation/classification circuit 801 generates control signal(s) to indicate the classification of a triangle which is used in configuring iterator setup calculation circuit 802. More specifically, the control signal(s) is used to set the content of the control register inside area calculation/classification circuit 802. For example, if the control bits are 00, the content of control register is all zeros (0's), if the control bits are 11, the content of the control register is all ones (1's), if the control bits are 01, the content of the control register (assuming an 8-bit register) is 00000111, etc. However, if the indicator signal indicates that user interface 816 or power monitor 817 has been activated, the bit string generated by these units is loaded into the control register. In other words, inputs received from user interface 816 and power monitor 817 override the classification result from area calculation/classification circuit 801. Pixel iterator circuit 803 and perspective divide circuit 804 are then used to process both small and well-behaved triangles and large or misbehaved triangles. In addition to allowing iterator setup calculation circuit 802 to be dynamically configured on a triangle by triangle basis to conserve power, this embodiment allows a balancing of graphics quality and performance to power requirement and battery life.

Except for the control register, area calculation/classification circuit 801 is substantially similar to area calculation/classification circuit 601. Pixel iterator circuit 803 is identical to pixel iterator circuit 603. Perspective divide circuit 804 is identical to perspective divide circuit 604. Iterator setup calculation circuit 802 is substantially similar to iterator setup calculation circuit 602. Mantissa register 700 may be modified to accommodate additional precision modes which modification should be clear to a person of ordinary skill in the art and is not further discussed. It should be noted that instead of being part of triangle setup engine 805 as shown in FIG. 8, iterator setup calculation circuit 802 can also be made part of rasterizing/rendering engine 806 as shown by the broken-line box.

Figure 9:
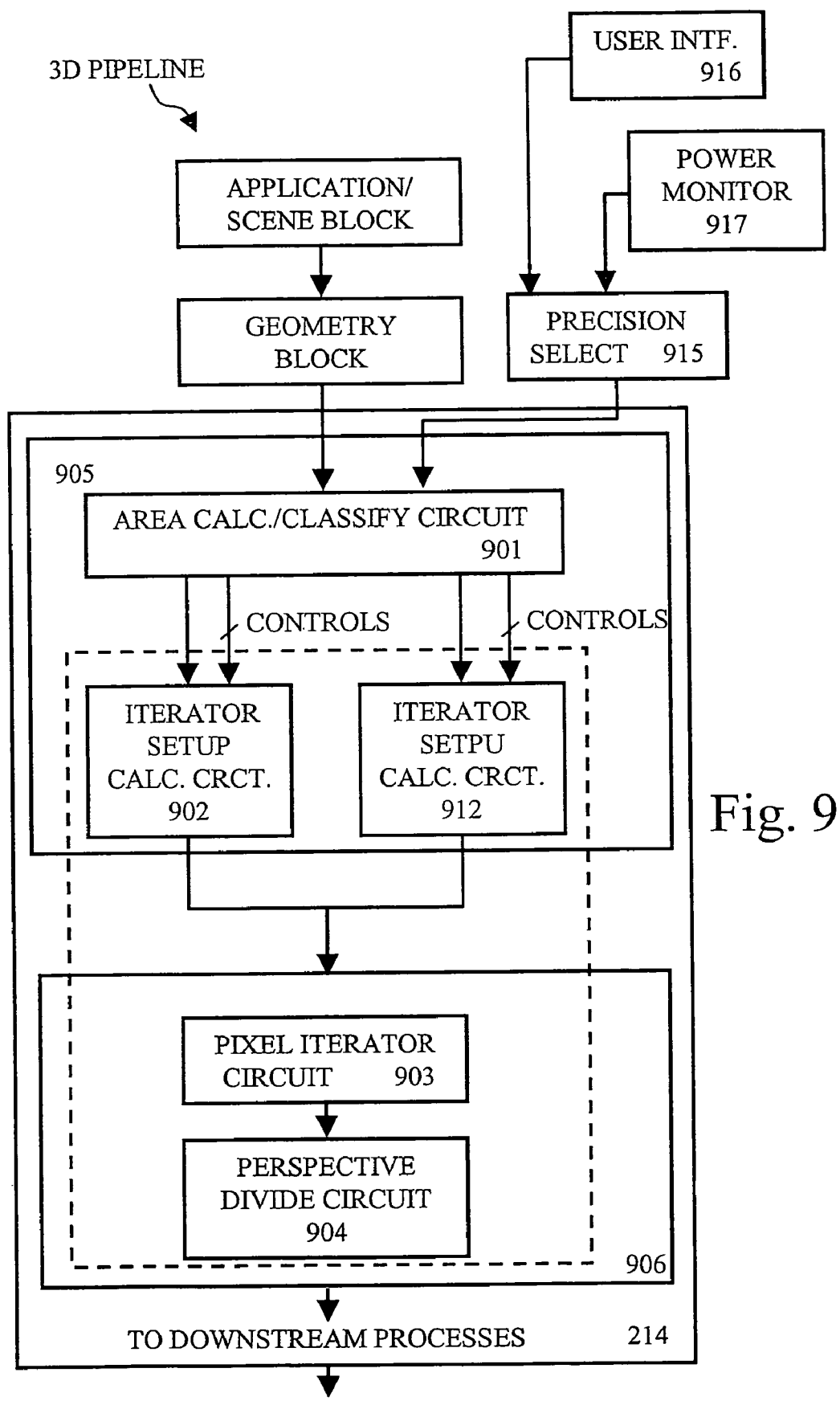
FIG. 9 illustrates the relevant components of a fifth embodiment of 3D GE 214 that implements the present invention.

Reference is now made to FIG. 9 which illustrates the relevant components of a fifth embodiment of 3D GE 214 that implements the present invention. As shown in FIG. 9, 3D GE 214 includes area calculation/classify circuit 901, iterator setup calculation circuit 902, iterator setup calculation circuit 912, pixel iterator circuit 903, and perspective divide circuit 904. Additionally, the current embodiment further includes precision select circuit 915 which is connected to user interface 916 and/or power monitor 917. Precision select circuit 915 may be external of 3D GE 214 (as shown in FIG. 9) or internal of 3D GE 214. Hence, this embodiment is a combination of the second embodiment shown in FIG. 5 and the fourth embodiment shown in FIG. 8. The descriptions of the components and their operations in FIGS. 5 and 8 are applicable to the corresponding components in FIG. 9 and are not repeated here. However, unlike the fourth embodiment, in the current embodiment, user interface 916 and power monitor 917 are allowed to control at least two different iterator setup calculation circuits 902 and 912 which are designed specifically to accommodate two classifications, "small and well-behaved triangles" and "large or misbehaved triangles", separately. Because iterator setup calculation circuits 902 and 912 are designed specifically for a classification, they can be more effective and efficient in processing triangles for a particular classification. Additionally, user interface 916 and power monitor 917 allow different precision modes to be selected for iterator setup calculation circuits 902 and 912 (i.e., for each of the two classifications).

A few minor modifications are necessary such as an additional indicator signal to be generated by precision select circuit 915 to indicate which classification is involved, an additional control register in area calculation/classification circuit 901 so that one is assigned to triangle setup calculation circuit 902 (for small and well-behaved triangles) and another is assigned to triangle setup calculation circuit 912 (for large and misbehaved triangles). When area calculation/classification circuit 901 determines the classification of the triangle, either iterator setup calculation circuit 902 or iterator setup calculation circuit 912 is used to process the triangle vertex information and attributes. The mantissa LSBs disablement for iterator setup calculation circuit 902 and iterator setup calculation circuit 912 is controlled by the respective control register. When area calculation/classification circuit makes its classification determination, it sets the content of the appropriate control register. If input from user interface 916 or power monitor 917 are received, the indicator signals from precision select circuit 915 indicate that either user interface 916 or power monitor 917 has been activated and for which classification (and accordingly which iterator setup calculation circuit) the input received is designated. This allows the string bits generated from precision select circuit to be sent to the appropriate control register to override the content set as a result of the classification by area calculation/classification circuit 901. It should be noted that instead of being part of triangle setup engine 905 as shown in FIG. 9, iterator setup calculation circuit 902 and iterator setup calculation circuit 912 can also be made part of rasterizing/rendering engine 906 as shown by the broken-line box.

Several embodiments of the present invention, a high quality and performance 3D graphics architecture suitable for portable handheld devices, are presented. While the present invention has been described in particular embodiments, the present invention should not be construed as limited by such embodiments, but rather construed according to the below claims.

What is claimed is:

1. A graphics engine coupled to memory and a processor, said graphics engine comprising:
a primitive setup engine for receiving graphics data from said memory and comprising a primitive classification circuit for classifying a primitive of said graphics data, wherein said primitive setup engine is operable to select a processing mode based on a classification of said primitive, and wherein said primitive setup engine is further operable to compute setup equations for said primitive in accordance with a selected processing mode to reduce power consumption without significantly sacrificing quality and performance; and
a rendering engine coupled to said primitive setup engine and for performing primitive pixel rasterization in accordance with said selected processing mode.

2. The graphics engine of claim 1, wherein said primitive is classified based on at least one of its size and other characteristics.

3. The graphics engine of claim 2, wherein said primitive is classified as at least one of small and well-behaved, large, and misbehaved.

4. The graphics engine of claim 2, wherein classification criteria for said other characteristics comprise at least one of texture, width, and depth.

5. The graphics engine of claim 1, wherein the primitive setup engine further comprises:
a first iterator setup calculation circuit coupled to said primitive classification circuit and for computing setup equations for a primitive classified as small and well-behaved in a low-precision processing mode as directed by said primitive classification circuit; and
a second pixel iterator setup calculation circuit coupled to said primitive classification circuit and for computing setup equations for a primitive classified as at least one of large and misbehaved in a high precision processing mode as directed by said primitive classification circuit.

6. The graphics engine of claim 5, wherein said low-precision processing mode uses 16 mantissa bits for floating-point calculation and said high-precision processing mode uses 24 mantissa bits for floating-point calculation.

7. The graphics engine of claim 1, wherein said rendering engine comprises:
a first pixel iterator circuit for performing scan line rasterization on primitives classified as small and well-behaved;
a first perspective divide circuit coupled to said first pixel iterator circuit and forming a low-precision pipeline that also comprises said first iterator setup calculation circuit, said first perspective divide circuit performing perspective correction on texture attributes of primitives classified as small and well-behaved;
a second pixel iterator circuit for performing scan line rasterization on primitives classified as large or misbehaved; and
a second perspective divide circuit coupled to said second iterator circuit and forming a high-precision pipeline that also comprises said second iterator setup calculation circuit, said second perspective divide circuit performing perspective correction on texture attributes of primitives classified as at least one of large and misbehaved.

8. The graphics engine of claim 7, wherein said rendering engine comprises:
a pixel iterator circuit coupled to said first iterator setup calculation circuit and said second iterator setup calculation circuit, said pixel iterator circuit for performing scan line rasterization on a plurality of primitives regardless of classification; and
a perspective divide circuit coupled to said pixel iterator circuit and for performing perspective correction on texture attributes of said plurality of primitives.

9. The graphics engine of claim 1, wherein said primitive setup engine further comprises a configurable iterator setup calculation circuit coupled to said primitive classification circuit, said configurable iterator setup calculation circuit configured by said primitive classification circuit to compute setup equations for a primitive classified as small and well-behaved in a low-precision processing mode, said configurable iterator setup calculation circuit configured by said primitive classification circuit to compute setup equations for a primitive classified as large and misbehaved in a high-precision processing mode.

10. The graphics engine of claim 9, wherein said primitive classification circuit is operable to configure said configurable iterator setup calculation circuit to operate in said low-precision processing mode by disabling a plurality of mantissa bits available for floating-point calculation and configuring said configurable iterator setup calculation circuit to operate in said high-precision processing mode by enabling said plurality of mantissa bits.

11. The graphics engine of claim 10, wherein said rendering engine comprises:
a pixel iterator circuit coupled to said iterator setup calculation circuit and for performing scan line rasterization on a plurality of primitives regardless of classification; and
a perspective divide circuit coupled to said pixel iterator circuit and for performing perspective correction on texture attributes of said plurality of primitives.

12. A graphics engine coupled to memory and a processor, said graphics engine comprising:
a primitive setup engine for receiving graphics data from said memory and comprising a primitive classification circuit for classifying a primitive of said graphics data, wherein said primitive setup engine is operable to select a processing mode based on a classification of said primitive, and wherein said primitive setup engine is further operable to compute setup equations for said primitive in accordance with a selected processing mode to reduce power consumption without significantly sacrificing quality and performance;
a user interface coupled to said primitive setup engine and for communicating information input by a user to said primitive classification circuit, said information for configuring said primitive classification circuit to operate in a desired processing mode; and
a rendering engine coupled to said primitive setup engine and for performing primitive pixel rasterization in accordance with at least one of said selected processing mode and said desired processing mode.

13. The graphics engine of claim 12, wherein said desired processing mode selected by said user overrides said selected processing mode selected by said primitive classification circuit.

14. The graphics engine of claim 12, wherein said primitive is classified based on at least one of its size and other characteristics.

15. The graphics engine of claim 14, wherein said primitive is classified as at least one of small and well-behaved, large, and misbehaved, and wherein classification criteria for said other characteristics comprise at least one of texture, width, and depth.

16. A graphics engine coupled to memory and a processor, said graphics engine comprising:
a primitive setup engine for receiving graphics data from said memory and comprising a primitive classification circuit for classifying a primitive of said graphics data, wherein said primitive setup engine is operable to select a processing mode based on a classification of said primitive, and wherein said primitive setup engine is further operable to compute setup equations for said primitive in accordance with a selected processing mode to reduce power consumption without significantly sacrificing quality and performance;

a power monitor coupled to said primitive classification circuit, said power monitor for determining a processing mode to enable completion of an actively running application, wherein said power monitor is operable to communicate said determined processing mode to said primitive classification circuit for configuration of said primitive classification circuit to operate in said determined processing mode; and a rendering engine coupled to said primitive setup engine and for performing primitive pixel rasterization in accordance with at least one of said selected processing mode and said determined processing mode.

17. The graphics engine of claim 16, wherein said power monitor determines said determined processing mode by comparing an indicator of available power with an indicator of remaining operating time of said actively running application.

18. The graphics engine of claim 17, wherein said determined processing mode overrides said selected processing mode selected by said primitive classification circuit.

19. The graphics engine of claim 16, wherein said primitive is classified based on at least one of its size and other characteristics.

20. The graphics engine of claim 19, wherein said primitive is classified as at least one of small and well-behaved, large, and misbehaved, and wherein classification criteria for said other characteristics comprise at least one of texture, width, and depth.

* * * * *